Nov. 17, 1953            L. OCHTMAN            2,659,466
IRREVERSIBLE DRIVE MECHANISM
Filed Dec. 1, 1950            2 Sheets-Sheet 1
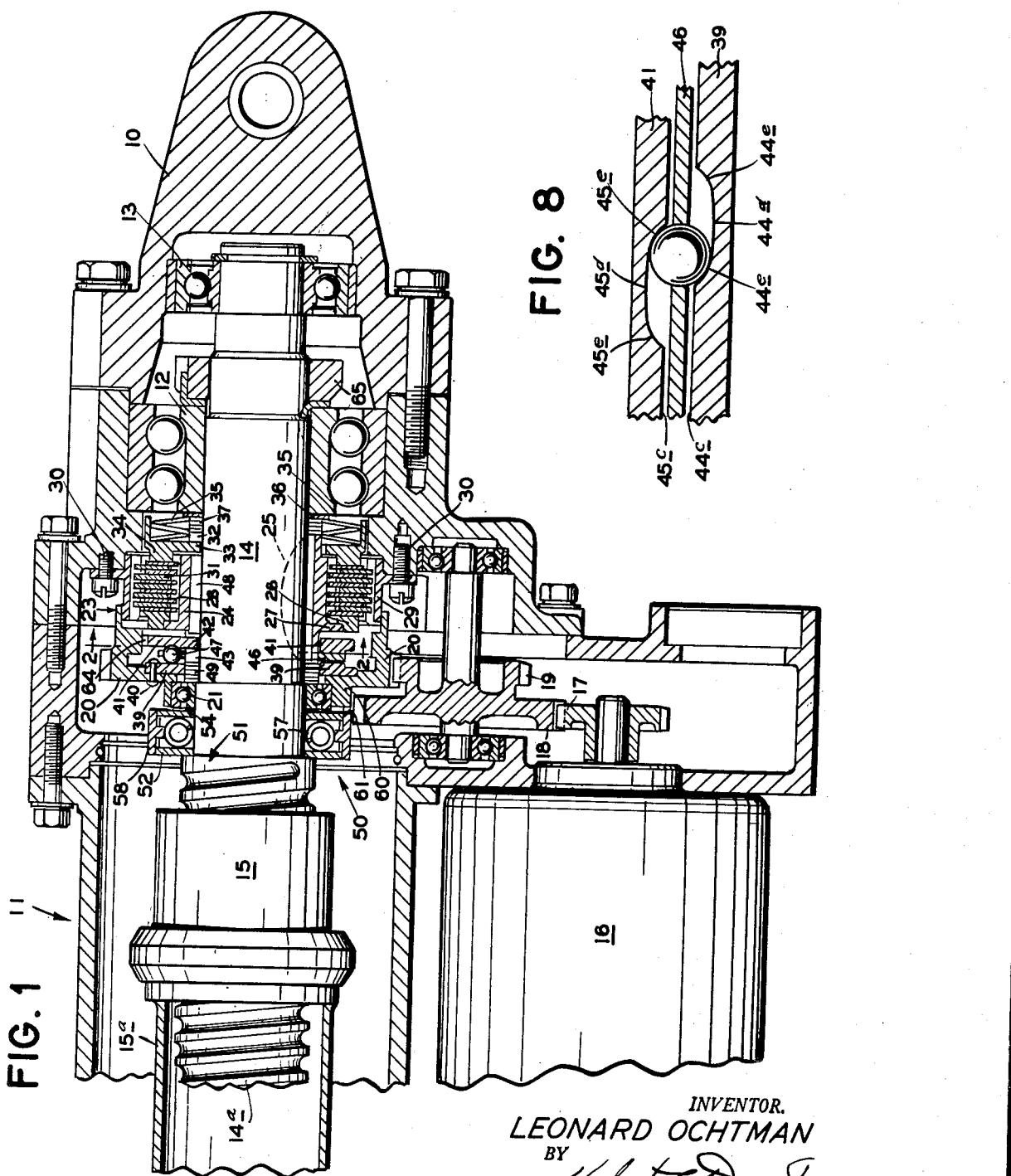
INVENTOR.
LEONARD OCHTMAN
BY
Herbert L. Davis Jr.
ATTORNEY Nov. 17, 1953 — L. OCHTMAN — 2,659,466
IRREVERSIBLE DRIVE MECHANISM
Filed Dec. 1, 1950 — 2 Sheets-Sheet 2
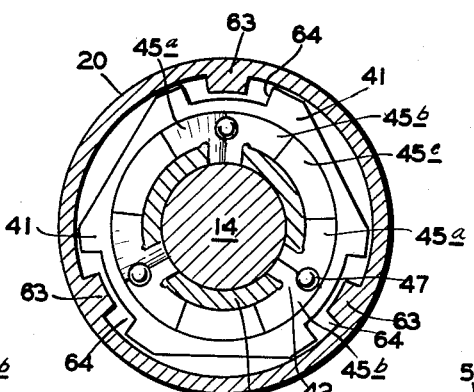
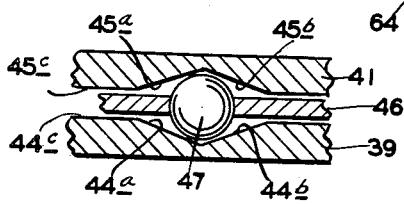
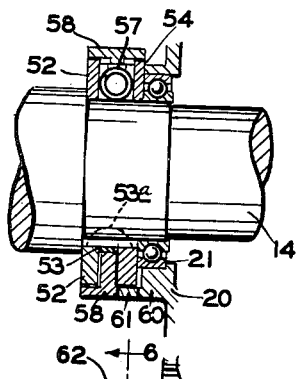
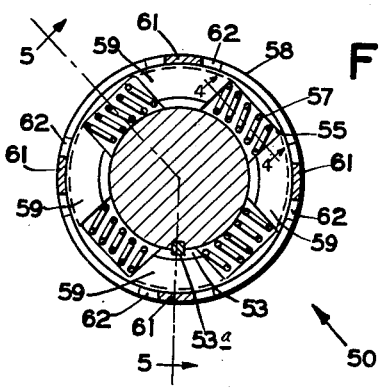
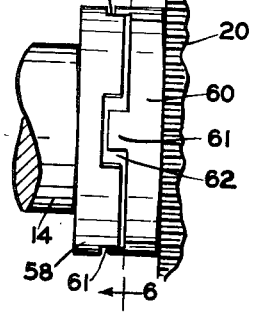
INVENTOR.
LEONARD OCHTMAN
BY
ATTORNEY Patented Nov. 17, 1953

2,659,466

UNITED STATES PATENT OFFICE 2,659,466

IRREVERSIBLE DRIVE MECHANISM

Leonard Ochtman, Ridgewood, N. J., assignor to Bendix Aviation Corporation, Teterboro, N. J., a corporation of Delaware Application December 1, 1950, Serial No. 198,584

10 Claims. (Cl. 192—8)

1

This invention relates generally to drive mechanisms and more specifically is directed toward a mechanism for driving, braking and releasably locking a driven member.

The instant invention has particular utility in linear actuator recirculating ball screw jacks of the type commonly used in aircraft to adjust or position control surfaces or other movable elements of the aircraft and which must be adapted for immediate and prompt response.

Screw jacks of the foregoing type are reversible in that an axial load applied to the nut will cause the screw shaft to rotate. It is apparent, therefore, that where an irreversible operation of the screw jack is desired, a mechanism must be provided to lock the screw shaft against rotation by an axial load applied to the nut thereof. Heretofore, such mechanisms have been basically overrunning clutches adapted to lock the screw shaft to the housing of the actuator to thereby prevent the rotation thereof during the time the shaft is not in operation and embodying means to unlock or release the screw shaft upon the initial rotation of the driving member.

In instances where a screw jack of the foregoing type has been operated with an aiding load, such as would be produced by the aerodynamic loading on a control surface operated by such a screw jack, the locking mechanism thereof has been found unsatisfactory in one or more of the following respects; chatter, excessive torque required to unlock or release the mechanism, causing over-run and thus making the screw jack incapable of "inching" or gradual movement, and excessive impact upon the stopping of the movement.

The instant invention proposes to overcome the foregoing disadvantages and to that end contemplates a drive mechanism embodying means whereby a driven member, such as the ball screw shaft of a linear actuator, may be normally secured against rotation in response to axial loads applied thereto, means for releasing said driven member upon the initial operation of the driving member, means for driving said driven member and means for braking and locking said driven member upon the stopping of the driving member.

Another object of the present invention is to provide a driving mechanism whereby power from a power source may be smoothly transmitted to a driven member.

The instant invention also contemplates a mechanism whereby a driven member may be smoothly halted and fixedly secured or locked

2 in position upon the stopping of the driving member.

A further object of the instant invention is to provide means whereby a braking and locking mechanism for a driven member may be released upon the initial application of power thereto by the driving member.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only, and are not to be construed as defining the limits of the invention.

In the drawings wherein like reference characters refer to like parts in the several views:

Fig. 1 is a fragmentary side view, in section, of a linear actuator wherein the instant invention is shown, in one embodiment thereof, as applied to the ball screw shaft of the actuator, Fig. 2 is a section taken along line 2—2 of Fig. 1, showing spherical brake release members in operative relation, Fig. 3 is a fragmentary section showing one of the spherical brake release members in neutral position between its coacting cam surfaces, Fig. 4 is a fragmentary section taken along line 4—4 of the spring driving assembly of Fig. 6, Fig. 5 is a section taken along line 5—5 of the spring driving assembly of Fig. 6, Fig. 6 is a section of the spring driving assembly taken along line 6—6 of Fig. 7, Fig. 7 is a fragmentary elevation showing the association of the driving gear to the driving connection, and Fig. 8 is a fragmentary section similar to Fig. 3 but showing a modification of the cam surfaces.

Referring now to Fig. 1 of the drawings, the numeral 10 designates a housing situated at one end of an actuator unit 11, and in which is rotatably mounted by main and auxiliary bearings 12 and 13, a ball screw shaft 14. A nut 15 operatively positioned on the threaded portion 14a of the shaft 14 has fixedly secured thereto a sleeve 15a which in turn is connected through a suitable linkage (not shown) to a movable aircraft control surface such as an aileron, or flap, the positioning of which is controlled by the actuator unit 11.

To provide means whereby the shaft 14 may be rotated to thereby move the nut 15 and sleeve 15a longitudinally thereof and thus position the control surface (not shown), a reversible power source such as electric or fluid motor 16 is mounted to the housing 10 and is connected through suitable gears 17, 18 and 19 to a driving gear 20 rotatably supported on shaft 14 by an anti-friction bearing 21. A multi-phase driving connection, which will hereinafter be more fully set forth, connects the driving member or gear 20 to the driven member or shaft 14.

It is important that an aircraft actuator be capable of small positive movements, and moreover since an axial load imposed on the nut 15 tends to rotate the shaft 14 in the housing 10, a braking and locking assembly generally indicated by the reference character 23 is provided to promptly and quickly arrest the rotation shaft 14 upon the stopping of the operation of the power source 16, and to fixedly secure the shaft 14 against rotation during times when the power source 16 is not operating. Moreover, as will be apparent from the following description, the braking and locking mechanism 23 also serves to materially assist in the smooth operation of the actuator unit 11.

To operatively associate the braking and locking assembly 23 to the shaft 14, a hub 24 is fixedly secured by a key 25 to the shaft 14. A brake plate 26 is positioned on and engages with a shoulder 27 formed on the hub 24 and friction discs 28 are splined to the hub 24 to rotate therewith. A brake ring 29 mounted to the housing 10 by bolts 30, has friction discs 31 splined thereto that are adapted to coact with the friction discs 28 splined to the hub 24. A series of radial slots 32 formed in the end of the hub 24 adjacent the bearing 12, are adapted to receive the lugs or extensions 33 of a pressure pad 34. The pressure pad 34 is therefore, mounted for a limited axial movement relative to the hub 24 and at the same time is adapted to rotate therewith. Springs 35, which may be of the Belleville type, are positioned between the pressure pad 34 and a washer 36 carried by the shaft 14 and which bears against main bearing 12. The springs 35 urge the pressure pad 34 in the direction of the brake plate 26 to the end that the coacting friction discs 28 and 31 are moved axially and pressed into engagement with each other between the brake plate 26 and pressure pad 34 and thus lock the shaft 14 to the housing 10. Shims 37 mounted on the shaft 14 and interposed between the end of the hub 24 and washer 36 serve as a means of adjusting the force exerted by the springs 35 on the pressure pad 34.

Thus, due to the foregoing arrangement, the shaft 14 is normally locked to the housing 10, and any rotation thereof in response to axial loads imposed thereon through the nut 15 is prevented.

As hereinbefore set forth, the instant invention contemplates means whereby a driven member normally locked against rotation, may be released for rotation upon the initial operation of the driving member. Moreover, the instant invention also contemplates means for smoothly transmitting the driving power to the driven member and for smoothly halting the driven member upon the stopping of the power source.

To that end, the driving gear 20 is provided with a cam plate 39 that is fixedly secured thereto by rivets or other suitable fastening means 40. A second cam plate 41 is provided with lugs 42 that engage radial slots 43 formed in the end of the hub 24 adjacent the driving gear 20, and which are similar in form and utility as the radial slots 32 formed in the opposite end of the hub 24. Thus, the cam plate 41 is adapted to rotate with the hub 24 and also to move axially or longitudinally thereof.

The cam plates 39 and 41 are provided with symmetrical or identical cam surfaces 44 and 45, respectively. The cam surface 44, as shown in Figure 3, is relatively simple in form, and comprises straight ramps 44a and 44b which rise symmetrically, at a relatively low angle from neutral to a flat portion 44c of the cam surface 44 as shown in Figs. 2 and 3. The cam surface 45 of the cam plate 41 is identical in form to the cam surface 44 and comprises straight, low angle ramps 45a and 45b rising to the flat portion 45c of the cam surface 45. The cam plates 39 and 41 are positioned relatively to each other so that when the braking and locking mechanism 23 is operative to lock the shaft 14, the cam surfaces 44 and 45 are symmetrically and directly opposite each other, and thus the ramps 44a and 44b are in registration with the ramps 45a and 45b, as shown in Figure 3.

A retaining ring 46, rotatably mounted on the hub 24 serves to maintain in spaced relationship a plurality of spherical members 47. The relative positions of the spherical members 47 in the ring 46 is such that when the shaft 14 is locked as aforesaid, the spherical members 47 are positioned in neutral, or at the bottom or lower portions of the ramps 44a, 44b, 45a and 45b, as shown in Fig. 3.

Since the cam plate 39 is fixedly secured to the gear 20 and hence cannot move axially of the shaft 14, any relative rotational movement of the cam plates 39 and 41 will cause the cam surfaces 44 and 45 to coact with the spherical members 47 in such a manner as to move the cam plate 41 away from the cam plate 39. This axial movement of the cam plate 41 is accommodated by the slots 43 formed on the hub 24. Thus, for example, should the gear 20 be rotated in one direction, the ramps 44a and 45b will coact with the spherical members 47 to move the cam plate 41 away from cam plate 39. On the other hand, upon the opposite rotation of the gear 20, the ram 44b and 45a will coact with spherical members 47 to effect the same movement of cam plate 41. Moreover, the greater the relative displacement of the cam plates 39 and 41, the greater will be the axial movement of the latter away from the former.

The hub 24 is grooved to accommodate a series of pins 48 that are adapted to slide on the shaft 14 between the lugs 42 of the cam plate 41 and lugs or extensions 33 of the pressure pad 34. Shims 49 interposed between the end of the hub 24 and the bearing 21 provide means whereby the position of the hub 24 on the shaft 14 may be adjusted so as to provide for a slight gap or space between the opposed ends of the pins 48 and the cam plate 41 and pressure pad 34 when the braking and locking mechanism 23 is operative to lock the shaft 14 against rotation. Thus, the full force of the springs 35 are permitted to act upon the pressure pad 34 to apply a positive locking action thereon, and at the same time the cam plate 41 does not exert any force upon the spherical members 47. However, upon the axial movement of the cam plate 41 in response to a displacement of cam plate 39 relative thereto, the opposed ends of the pins 48 will be engaged between the lugs 42 of the cam plate 41 and extensions 33 of the pad 34. Any further axial movement of the cam plate 41 compresses the springs 35 thereby relieving the pressure thereof acting on the friction discs 28 and 31 to the end that the shaft 14 will be released for rotation.

A resilient or spring drive assembly, generally designated by the reference character 50 is fixedly mounted on the shaft 14 and positioned between a shoulder 51 formed on the shaft 14 and the anti-friction bearing 21. This spring drive assembly comprises an end plate 52 having a hub 53 which serves to hold in spaced relationship, a second end plate 54. The end plates 52 and 54 are milled across the inner faces thereof to provide a series of slots 55 and 56, respectively, as shown in Figs. 4 and 6, and in which are positioned driving springs 57. The hub 53 is secured to shaft 14 by a key 53a which also has a portion thereof engaging the end plate 54 to the end that end plate 54 is keyed to the shaft 14 and the slots 55 and 56 are held in registration.

A driving ring 58 is provided with spaced, radial fingers 59, that are adapted to fit between the end plates 52 and 54 to rotatably support the driving ring on the hub 53. The radial fingers 59 correspond in size and form to the unslotted portions of the inner surfaces of the end plates 52 and 54, and are positioned to abut the ends of the springs 57. Thus, any rotation of the driving ring 58 relative to the end plates 52 and 54 serves to compress the driving springs 57. To associate the driving gear 20 with the spring drive assembly 50, the hub 60 of the gear 20 is provided with laterally extending lugs 61 that are adapted to be received in slots 62 formed in driving ring 58, as shown in Figs. 5, 6 and 7. The lugs 61 are somewhat smaller in dimension than slots 62 to permit a limited rotation of the gear 20 prior to the engagement thereof with the end walls of the slots 62. The purpose of this limited rotary movement of the gear 20 relative to the driving ring 58 prior to the engagement thereof will be thereinafter more fully set forth in the description of the operation of the subject drive mechanism.

In order to prevent the overloading of the springs 57 when the shaft 14 is being rotated through the spring drive assembly 50, means are provided to limit the deflection of the springs 57. To that end, the driving gear 20 is provided with a series of depending fingers or lugs 63 that are adapted to be received in notches 64 formed in the periphery of the cam plate 41 as shown in Figs. 1 and 2. The lugs 63 are somewhat smaller than their coacting notches 64 so that a limited rotation therebetween may be had prior to the engagement thereof. However, this relative rotary movement is limited and so adjusted that the lugs 63 will not engage the end walls of the notches 64 until the lugs 61 of the gear 20 engage the end walls of the slots 62 in the driving ring 58 and have compressed the driving springs 57 to a predetermined degree of compression.

The spring drive assembly 50, anti-friction bearing 21, shims 49, hub 24, shims 37, washer 36 and main bearing 12 are held in their relative and adjusted positions on the shaft 14 by a nut 65 threaded onto the shaft 14.

Due to the foregoing construction and arrangement of parts, the operation of the motor 16 in either direction will rotate the gears 17, 18 and 19 which in turn will rotate the gear 20. Since the braking and locking mechanism 23 is normally effective to lock the shaft 14 to the housing 10, the gear 20 and its cam plate 39 are angularly displaced relative to the cam plate 41 and the spherical members 47 roll up either the ramp 44a and 45b, or 44b and 45a depending upon the direction of rotation of the gear 20. The cam plate 41 is thereby moved axially through the slots 43 and the pins 48 are engaged between the cam plate 41 and pressured pad 34. Upon the continued axial movement of the cam plate 41 in response to a greater angular displacement of cam plate 39 relatively thereto, the pins 48 press against pressure pad 34 and relieve the pressure of the springs 35 acting upon the friction discs 28 and 31 thereby releasing the shaft 14 from the housing 10 to permit the rotation thereof. It is also to be noted that as the cam plate 41 moves axially away from cam plate 39 the springs 35 place a resisting load on the cam plate 41 to the end that cam plate 41 is spring loaded by the springs 35.

In order to fully describe the operation of the subject drive mechanism and to illustrate its particular adaptability for use in a linear actuator, the operation thereof will be described under conditions where the load on the nut 15, and hence the shaft 14, sequentially changes from an aiding load, to a no load or a relatively light opposing load, to a normal opposing load and finally to an overload.

As hereinbefore set forth, upon the operation of the motor 16, the gears 17, 18 and 19 rotates the driving gear 20, anti-friction bearing 21 permits the gear 20 to rotate freely on the shaft 14, but since the shaft 14, and hence cam plate 41, is at this time locked against rotation relative to the housing 10, it is apparent that the cam plate 39 is angularly displaced relative to the cam plate 41. The cam surfaces 44 and 45, coacting with the spherical members 47, move the cam plate 41 axially along the shaft 14, and pins 48 are brought into engagement between the cam plate 41 and pressure pad 34. Upon the continued axial movement of cam plate 41 the pressure of the springs 35 is relieved from the friction discs 28 and 31 of the braking and locking assembly 23. An aiding load acting through nut 15, on the shaft 14, tends to rotate the shaft in the housing 10, so that as soon as the pressure of springs 35 is relieved to a point where slippage can occur between the friction discs 28 and 31, the shaft 14 rotates in response to the aiding load. The cam plate 41 therefore, rotates with the shaft 14 and follows the gear 20 and its cam surface 39. Since the load on the nut 15 is thus absorbed by the shaft 14 and braking and locking assembly 23, the torque at gear 20 need only be of sufficient magnitude to displace the cam plates 39 and 41 to a point where the pressure of springs 35 is relieved to permit slippage between the friction discs 28 and 31. Any tendency of the shaft 14 and cam plate 41 to overtake the gear 20 and cam plate 39 is immediately counteracted, because as the cam plate 41 overtakes the cam plate 39, it will move axially in the direction thereof, thus permitting the springs 35 to exert a greater pressure on the friction discs 28 and 31 to the end that a braking action is applied to the shaft 14 to retard its rotation.

When the load conditions imposed on the nut 15 change from an aiding load to no load or a light opposing load, the additional torque required at gear 20 to rotate the shaft 14 against these load conditions causes the cam plate 39 to assume a greater angular displacement relative to cam plate 41 and the axial distance between the cam plates 39 and 41 is increased. As hereinbefore set forth, this axial movement of cam plate 41 compresses springs 35, and thereby results in the concurrent relieving of pressure on friction discs 28 and 31 and the spring loading of cam plate 41. Due to this spring loading of cam plate 41, a driving connection is established between gear 20 and shaft 14 by the reaction of the spring load, on the spherical members 47 against the ramps or cam surfaces 44a and 45b (or 44b and 45a depending upon the direction of rotation of gear 20). Thus, under these load conditions a power path is established from the driving gear 20, through cam plate 39, spherical members 47, cam plate 41, hub 24 to the shaft 14. This path of power transmission becomes effective as soon as the torque applied to gear 20 is of sufficient magnitude to relieve the pressure of springs 35 on friction discs 28 and 31 to a point where slippage occurs, and the cam plate 41 is spring loaded by the springs 35 to a point where the shaft 14 rotates against the load applied to it through the nut 15.

Upon the increase in the load opposing the rotation of the shaft 14, the cam plates 39 and 41 are further angularly displaced and the springs 35 are therefore compressed to a point where the friction discs 28 and 31 are free to rotate relatively to each other. The shaft 14 is then unlocked for free rotation relative to the housing 10.

During the foregoing relative angular displacements of the cam plates 39 and 41 the lugs 61 on the gear 20 have also moved in the slots 62 formed in the driving ring 58. As hereinbefore set forth, the lugs 61 are somewhat smaller in dimension than the slots 62 to the end that a limited relative movement is permitted therebetween before the former engage the end walls of the latter. However, this relative free movement of lugs 61 and 62 is so limited that just prior to the point where the pressure of the springs 35 is fully relieved from friction discs 28 and 31, the lugs 61 engage the end walls of the slots 62. The ring 58 is therefore rotated and the fingers 59 thereof moving between the end plates 52 and 54 compress the driving springs 57. Thus, at the point where the shaft 14 is unlocked from the housing 10, the driving connection operative to rotate the shaft 14 in the presence of light opposing loads is supplemented by the spring drive assembly 50. The torque path or power transmission in this instance being in part from the gear 20, through the cam plate 39, spherical members 47, cam plate 41, hub 24 to the shaft 14 and in part from gear 20 through driving ring 58, fingers 59, springs 57, end plates 52 and 54, hub 53 to the shaft 14.

When the load on the nut 15 increases to an overload condition where springs 57 would be compressed beyond a desired deflection, a second supplementary driving connection is brought into operation. As previously set forth, the gear 20 is provided with a series of depending lugs 63 that are adapted to be received in notches 64 formed in the periphery of cam plate 41, and a certain limited rotation therebetween is permitted prior to the engagement of the lugs 63 with the end walls of the notches 64 until the springs 57 are deflected to a desired position. It is apparent, therefore, that should the load opposing the rotation of shaft 14 be of a magnitude that would result in the over-deflection of the springs 57, the lugs 63 engage the notches 64 to establish the second supplementary driving connection. In this instance, the power path is formed in part from gear 20, through the cam plate 39, spherical members 47, cam plate 41, hub 24, to the shaft 14, in part from gear 20 through lugs 61, slots 62, driving ring 58, fingers 59, springs 57, end plates 52 and 54, hub 53 to the shaft 14 and in part from gear 20 through lugs 63, slots 64, cam plate 41, hub 24 to the shaft 14.

Upon the stopping of the motor 16, the cam plate 41 overtakes the cam plate 39 and the spherical members 47 are thereby returned to neutral position between the cam surfaces 44 and 45. The cam plate 41 also moves axially in the direction of cam plate 39 during the time it is overtaking cam plate 39, with the result the springs 35 are permitted to exert their full pressure against pressure pad 34. The friction plates 28 and 31 are thereby firmly clamped into engagement between ring 26 and pressure pad 34 and the shaft 14 is smoothly braked to a halt and locked to the housing 10.

It is to be noted that the driving mechanism, hereinbefore set forth in detail, can be modified so as to obviate the necessity of using the spring drive assembly 50. In this instance, the cam plates 39 and 41 are constructed so as to have compound cam surfaces 44c and 45c respectively, as shown in Fig. 8. These compound surfaces 44c and 45c comprise control low portions 44d and 45d of relatively low curvature rising symmetrically each side of neutral, followed by end portions 44e and 45e of relatively greater curvature. Thus, the radius of the curve of the central portions 44d and 45d being substantially large, affords only a relatively slight axial displacement of the cam plates 39 and 41 upon the initial rotational displacement thereof.

This relatively slight axial movement of cam plate 41 serves to take up the normal clearance between the spherical members 47 and the cam plates 39 and 41, and to initially release the shaft 14 for rotation in response to aiding loads imposed thereon and in that respect is similar to the operation of the mechanism previously described, in that in the presence of aiding loads this slight axial movement results in releasing the friction members 28 and 31 to the end that the shaft 14 is free to rotate in response to aiding loads imposed thereon and the driving member 20 serves only to release the engagement of the friction members aforesaid.

As shown in Fig. 8 the cam plates 39 and 41 have been angularly displaced to a point where the spherical members 47 are about to engage the end portions 44e and 45e. It is apparent, therefore that with an opposing load on shaft 14, any further angular displacement of the cam plates 39 and 41 will cause a further axial displacement of the cam plate 41 to the end that the pressure of the springs 35 will be completely relieved from the friction discs 28 and 31 and imposed on the cam plate 41. Thus, the shaft 14 will be fully released for rotation by the driving member 20 and a torque path between the former and the latter will be established by the reaction of the spring loaded cam plate 41 on the spherical members 47 and the cam surfaces 44e and 45e. In this instance, the torque path is from the driving member 20, through the cam plates 39 and 41 and their coacting spherical members 47, to the hub 24 and thence to the shaft 14. This driving path is similar to that established by the spring drive 50 in that normal loads are driven through this medium.

Due to the sharply rising curve of the end portions 44e and 45e the torque increases rapidly upon a relatively slight angular displacement of the cam plates 39 and 41, and therefore, a quick return of the spherical members 47 to the low portions 44d and 45d of the cam plates 39 and 41 and the concurrent rapid application of the braking mechanism is assured upon the stopping of the driving member 20.

It is understood of course, that where the compound cam surfaces are used, the lugs 63 of the driving gear 20 and the notches 64 of the cam plate 41 are designed and constructed to engage in the presence of excessive loads. Thus, the driving path through the driving member 20, lugs 63, notches 64, cam plate 41 and hub 25 to the shaft 14 as hereinbefore set forth is also used in this modified form of the driving mechanism contemplated herein.

Although but one embodiment of the invention has been illustrated and described in detail, it is to be expressly understood that the invention is not limited thereto. Various changes may be made in the design, construction and arrangement of the parts without departing from the spirit and scope of the invention as the same will now be understood by those skilled in the art.

What I claim is:

1. A drive mechanism for driving, braking and releasably locking a shaft that is rotatably mounted in a stationary structure, comprising a braking and locking assembly for braking the rotation of said shaft and for locking said shaft to said stationary structure to thereby prevent the rotation thereof, a driving member rotatably mounted on said shaft and including first cam means, a hub fixedly mounted to said shaft, second cam means mounted in said hub for rotation therewith and adapted to move axially thereof, rolling members interposed between and coacting with said first and second cam means and operative upon relative angular displacements of said first and second cam means to move the latter axially along said hub, and means slidable in said hub and operative between said second cam means and said braking and locking assembly in response to the axial movement of said second cam means to operate said braking and locking assembly whereby said shaft is freed to rotate in response to the rotation of said driving member.

2. A drive mechanism for driving, braking and releasably locking a shaft that is rotatably mounted in a stationary structure, comprising a braking and locking assembly including pressure means for braking the rotation of said shaft and for locking said shaft to said housing to prevent the rotation thereof, a driving member rotatably mounted on said shaft, a first cam plate fixedly secured to said driving member, a hub secured to said shaft, a second cam plate carried by said hub for rotation therewith and movable axially thereto, rolling members interposed between and coacting with said first and second cam plates whereby angular displacements of said first and second cam plates move said second cam plate axially of said hub, and means slidably mounted in said hub between said second cam plate and said pressure means, said slidably mounted means freely slidable between said second cam plate and pressure means when said shaft is locked to said housing and effective on axial movements of said second cam plate to connect said second cam plate and said pressure means whereby said pressure responsive means is operated to effect the braking and locking assembly in a manner to permit the rotation of said shaft in response to the rotation of said driving member.

3. A drive mechanism for driving, braking and releasably locking a shaft that is rotatably mounted in a structure, comprising a hub fixedly mounted on said shaft, a brake ring fixedly secured to said structure, friction discs carried by said hub and brake ring respectively, resilient means for pressing said friction discs into engagement to brake the rotation of said shaft and to lock said shaft to said stationary member, a driving member rotatably mounted on said shaft, first cam means fixedly secured to said driving member, second cam means mounted to said hub for rotation therewith and movable axially thereof, means interposed between and coacting with said first and second cam means whereby the rotational displacement of said first cam means relative to said second cam means moves the latter axially of said hub, and means interposed between said second cam means and said resilient means whereby the axial movement of said second cam means transfers the pressure of said resilient means from said friction discs to said second cam means to thereby unlock said shaft from said stationary member and concurrently establish a driving connection between said driving member and said shaft.

4. A drive mechanism for driving, braking and releasably locking a driven member rotatably supported in a fixed structure, comprising an assembly for braking the rotation of said driven member and for locking said driven member to said fixed structure, a driving member rotatably mounted on said driven member, cam means carried by said driving and driven members and operative upon a first predetermined angular displacement of the former relative to the latter to release said locking assembly and to concurrently establish a driving connection through said cam means between said driving and driven members, a spring drive assembly carried by said driven member, and means for engaging said driving member to said spring drive assembly upon a second predetermined angular displacement between said driving and driven members whereby a supplementary driving connection is established by said spring drive assembly between said driving and driven members.

5. A drive mechanism for driving, braking and releasably locking a driven member rotatably supported in a structure, comprising an assembly for braking the rotation of said driven member and for locking said driven member to said structure, a driving member rotatably mounted on said driven member, means including first cam means carried by said driving member and second cam means carried by said driven member and operative upon an angular displacement of the former to the latter to release said locking assembly and to concurrently establish a driving connection between said driving and driven member, a spring drive assembly carried by said driven member, means for engaging said driving member to said spring drive assembly upon a predetermined angular displacement between said driving and driven members whereby a supplementary driving connection is established between said driving and driven member, and said driving member and second cam means including means for establishing a second supplementary driving connection between said driving and driven members upon a predetermined angular displacement of said driving member to said second cam means.

6. A drive mechanism for driving, braking and releasably locking a shaft rotatably mounted in a structure, comprising a hub fixedly mounted on said shaft, a brake ring fixedly secured to said structure, friction means carried by said hub and ring respectively and movable axially into and out of engagement, pressure means carried by said shaft and operative to bias said friction means into engagement to thereby brake and lock said shaft to said stationary member, a driving member rotatably mounted on said shaft, a first cam plate fixedly secured to said driving member and including a cam surface, a second cam plate including a cam surface identical in form to said first cam surface, said second cam plate being mounted on said hub for rotation therewith and adapted to move axially thereof, rolling members interposed between the cam surfaces of said first and second cam plates and adapted for coaction therewith whereby a rotational displacement of said cam surfaces relative to each other causes said second cam plate to move axially of said hub, and means operable between said second cam plate and said pressure means and operative upon the axial movement of said second cam plate to transfer the biasing effect of said pressure means from said friction discs to said second cam plate whereby said shaft is unlocked from said stationary member and concurrently therewith a driving connection is established between said driving member and said shaft.

7. A drive mechanism for driving, braking and releasably locking a shaft rotatably mounted in a structure, and which is rotatable in response to axial loads imposed thereon, comprising a hub fixedly mounted on said shaft, a brake ring fixedly secured to said structure, friction means carried by said hub and ring respectively and movable into and out of engagement, pressure means carried by said hub and engageable with said friction means, a driving member rotatably mounted on said shaft, a first cam plate fixedly secured to said driving member and having a cam surface comprising low angle ramps rising symmetrically each side of neutral, a second cam plate having a cam surface identical in form to the cam surface on said first cam plate, said second cam plate being carried by said hub and adapted to rotate therewith and move axially thereto, rolling members interposed between said first and second cam plates, and adapted to coact with said cam surfaces, means for connecting said second cam plate to said pressure means, a spring drive assembly mounted to said shaft and adapted to rotate therewith, means for engaging said driving member to said spring drive assembly, and means for engaging said driving member to said second cam plate, the foregoing elements being so constructed and arranged that when said driving member is stationary, the pressure means are operative to fully engage with friction means and the cam surfaces of said first and second cam plates are symmetrically and oppositely disposed to each other with the rolling members positioned at the low portion of said cam surfaces, upon the rotation of the driving member the resulting angular displacement of said first cam plate to said second cam plate causes said rolling members to react with said cam surfaces to the end that said second cam plate moves axially of said hub, upon a predetermined axial movement said second cam plate engages said pressure means through said connecting means and concurrently, pressure is relieved from said friction means to permit rotation of said shaft in response to an axial load imposed thereon, and transferred to said second cam plate, upon a further predetermined movement of said second cam plate the transfer of pressure from said pressure means serves to establish a driving connection between said driving member and shaft, upon a predetermined angular displacement of said driving member to said shaft the spring driving assembly is engaged to said member to supplement the driving connection aforesaid, and upon a predetermined angular displacement of said driving member to said second cam plate a second supplementary driving connection between said driving member and shaft is established.

8. A drive mechanism for driving, braking and releasably locking a shaft rotatably mounted in a structure and that is rotatable in response to axial loads imposed thereon, comprising a hub fixedly mounted on said shaft, a brake ring fixedly secured to said structure, friction means carried by said hub and ring respectively and adapted for axial movement into and out of engagement with each other, pressure means carried by said hub and normally operative to press said friction means into engagement to lock said shaft to said structure and thereby prevent the rotation thereof in response to axial loads imposed thereon, a driving member rotatably mounted on said shaft and including a first cam plate fixedly secured thereto, a second cam plate mounted on said shaft and adapted to rotate with said hub and to move axially thereto, identical cam surfaces on said first and second cam plates, and normally disposed symmetrically opposite each other, rolling members interposed between and adapted to coact with said cam surfaces whereby angular displacements of said cam surfaces from normal position moves said second cam plate axially of said hub, means for connecting said second cam plate to said pressure means and operative upon a predetermined axial movement of said second cam plate to actuate the pressure means so as to relieve the pressure exerted on said friction means and concurrently imposed pressure on said second cam plate, the initial axial movement of said second cam plate resulting in releasing said shaft for rotation in response to an axial load imposed thereon and remaining axial movement resulting in establishing a driving connection between said driving member and said shaft, a spring drive assembly mounted on said shaft for rotation therewith, means on said driving member adapted for engagement with said spring drive assembly upon a predetermined angular displacement of said driving member to said spring drive assembly and whereby a supplementary driving connection is established between said driving member and said shaft, and means for engaging said driving member to said second cam plate upon a predetermined angular displacement of the former to the latter to establish a second supplementary driving connection between said driving member and said shaft.

9. A drive mechanism for driving, braking and releasably locking a driven member that is rotatably mounted in a stationary structure, comprising a braking and locking assembly normally operative to lock said driven member to said stationary structure, means for concurrently releasing said braking and locking mechanism and establishing a first driving connection between said driving member and said driven member, and means for sequentially establishing second and third driving connections between said driving and driven members to supplement said first driving connection.

10. For use in a linear actuator of the class having a housing, a shaft rotatably mounted in said housing and rotatable in response to an axial load imposed thereon, and a power source for actuating said shaft, the combination with said power source and shaft of a drive mechanism for actuating said shaft in response to the operation of said power source comprising a hub mounted on said shaft, a brake ring secured to said housing, friction discs carried by said hub and brake ring respectively and axially movable into and out of engagement, pressure means for urging said friction discs into engagement to thereby effect the braking and locking of said shaft, a driving member rotatably mounted on said shaft and in power transmitting association with said power source, a first cam surface formed on said driving member, a cam plate mounted on said shaft and adapted to rotate with and move axially of said hub, a cam surface formed on said cam plate, said cam surfaces being identical in form and comprising straight low-angle ramps rising symmetrically each side of neutral, rolling members interposed between said cam surfaces, said cam surfaces and rolling members being so constructed and arranged that when said friction discs are fully engaged said cam surfaces are symmetrically and oppositely disposed relative to each other and rolling members are positioned in the low portions of said cam surfaces, and when said cam surfaces are angularly displaced in response to a relative angular movement of said driving member to said cam plate said cam surfaces coact with said rolling members to move said cam plate axially in said hub and in a direction away from said driving member, means for connecting said cam plate to said pressure means whereby upon a predetermined axial movement of said cam plate the pressure exerted by said pressure means is concurrently relieved from said friction discs and applied to said cam plate to thereby permit the rotation of said shaft in response to an axial load imposed thereon, and the further axial movement of said cam plate results in establishing a driving connection between said driving member and shaft through said rolling members, a first supplementary driving connection between said driving member and said shaft comprising a first end plate having a hub mounted to said shaft, a second end plate mounted on said shaft and spaced from said first end plate by said hub, a plurality of recesses formed in the inner surfaces of said end plates and in registration with each other, a spring positioned in each of said recesses, a driving ring having a plurality of radial fingers mounted on said hub and rotatable between said end plates, said radial fingers adapted to engage said springs whereby a relative movement of said driving ring to said end plates compresses said springs, a plurality of slots formed in the periphery of said driving ring, a plurality of lateral lugs formed on the hub of said driving member and positioned in said slots, said lateral lugs being of smaller dimension than said slots to permit a limited relative rotation therebetween before the former engage the latter, and a second supplementary driving connection between said driving member and said shaft comprising a plurality of radially depending lugs formed on said driving member, a plurality of notches formed in the outer edge portion of said cam plate, said radial lugs being of smaller dimension than said notches to permit a limited relative movement therebetween before the engagement thereof, the limited movement of said radial lugs in said notches being such that the former engages latter only after the lateral lugs of said driving member have engaged the slots in said driving ring and before said springs are fully compressed by said radial fingers.

LEONARD OCHTMAN.

References Cited in the file of this patent

UNITED STATES PATENTS

| Number | Name | Date |
|---|---|---|
| 1,634,861 | Weyman | July 5, 1927 |
| 1,808,008 | Smithials | June 2, 1931 |
| 2,251,466 | Payson | Aug. 5, 1941 |
| 2,566,705 | Mergen et al. | Sept. 4, 1951 |

FOREIGN PATENTS

| Number | Country | Date |
|---|---|---|
| 630,232 | Germany | May 23, 1936 |